United States Patent
Sgouros et al.

(10) Patent No.: US 8,914,237 B2
(45) Date of Patent: Dec. 16, 2014

(54) METHOD AND SYSTEM FOR GAMMA CAMERA COUNT RATE SATURATION CORRECTION

(75) Inventors: George Sgouros, Ellicott City, MD (US); Robert Hobbs, Baltimore, MD (US)

(73) Assignee: The John Hopkins University, Baltimore, MD (US)

( * ) Notice: Subject to any disclaimer, the term of this patent is extended or adjusted under 35 U.S.C. 154(b) by 336 days.

(21) Appl. No.: 12/690,471

(22) Filed: Jan. 20, 2010

(65) Prior Publication Data

US 2011/0176018 A1  Jul. 21, 2011

(51) Int. Cl.
| | |
|---|---|
| *G01N 33/48* | (2006.01) |
| *G01N 33/50* | (2006.01) |
| *G06K 9/00* | (2006.01) |
| *G01T 1/164* | (2006.01) |
| *G01T 1/163* | (2006.01) |

(52) U.S. Cl.
CPC .............. *G01T 1/1647* (2013.01); *G01T 1/163* (2013.01)
USPC ............. 702/19; 382/128; 382/131; 382/254; 378/4; 600/300

(58) Field of Classification Search
USPC ............... 364/413.24, 413.13; 382/6, 44; 250/363.03; 378/15, 205; 702/19; 348/222.1
See application file for complete search history.

(56) References Cited

U.S. PATENT DOCUMENTS

| 5,337,231 A * | 8/1994 | Nowak et al. ............... 600/425 |
|---|---|---|
| 7,046,762 B2 | 5/2006 | Lee |
| 2005/0028869 A1 | 2/2005 | Roth et al. |
| 2005/0288869 A1* | 12/2005 | Kroll et al. ................... 702/19 |
| 2006/0050839 A1* | 3/2006 | Balan et al. ................... 378/4 |
| 2011/0174594 A1* | 7/2011 | Redick et al. ................ 198/572 |

OTHER PUBLICATIONS

C. Chiesa, A practical dead time correction method in planar activity quantification for dosimetry during radionuclide therapy, Dec. 2009, Quarterly Journal of Nuclear Medicine and Molecular Imaging pp. 658-669.*
Thomas Bortfeld et al, "Image-Guided IMRT", Springer, pp. V-XII, and 1-460, Copyright 2006.
U.S. Appl. No. 12/514,853.
U.S. Appl. No. 12/687,670.
U.S. Appl. No. 12/820,852.
International Search report issued in International Application PCT/US2007/085400, mailed Sep. 8, 2010.
Oliver W. Press et al., "A Phase I/II Trial of Iodine-131-tositumornab (anti-CD20),etoposide, cyclophosphamide, and Autologous Stem Cell Transplantation of Relapse B-Cell Lymphomas", Blood, vol. 96, No. 9, pp. 2934-2942, Nov. 1, 2000.

(Continued)

*Primary Examiner* — James Hannett
*Assistant Examiner* — Stephen Coleman
(74) *Attorney, Agent, or Firm* — Johns Hopkins Technology Transfer (57) ABSTRACT

A system and method for adjusting count rate information, comprising: acquiring, using at least one detector, static image information from at least one imaged object; acquiring, using the at least one detector, whole body image information from the at least one imaged object; determining, using at least one computer application, the count rate information using the static image information and the whole body image information; and adjusting, using the at least one computer application, the count rate information by accounting for movement between the at least one detector and the at least one imaged object.

18 Claims, 10 Drawing Sheets

(56) References Cited

OTHER PUBLICATIONS

B. Emami et al., "Tolerance of Normal Tissue to Therapeutic Irradiation", Int. J. Radiation Oncology Biol. Phys., vol. 21, pp. 109-122 (1991).

Roger Dale et al., "The Radiobiology of Conventional Radiotherapy and its Application to Radionuclide Therapy", Cancer Biotherapy & Radiopharmaceuticals, vol. 20, No. 1, pp. 47-51 (2005).

Roger Dale, "Use of the Linear-Quadratic Radiobiological Model for Quantifying Kidney Response in Targeted Radiotherapy", Cancer Biotherapy & Radiopharmaceuticals, vol. 19, No. 3, pp. 363-370 (2004).

Joseph A. O'Donoghue, "Implications of Nonuniform Tumor Doses for Radioimmunotherapy", The Journal of Nuclear Medicine, vol. 40, No. 8, pp. 1337-1341, Aug. 1999.

MIRD Pamphlet No. 21: A Generalized Schema for Radiopharmaceutical Dosimetry—Standaradization of Nomenclature, The Journal of Nuclear Medicine, vol. 50, No. 3, pp. 477-484, Mar. 2009.

Bin He et al., "A Monte Carlo and Physical Phantom Evaluation of Quantitative In-111 SPECT", Physics in Medicine Biology, vol. 50, pp. 4169-4185 (2005).

H. Malcolm Hudson et al., "Accelerated Image Reconstruction Using Ordered Subsets of Projection Data", IEEE Transactions on Medical Imaging, vol. 13, No. 4, pp. 601-609, Dec. 1994.

Dan J. Kadrmas et al., "Fast Implementations of Reconstruction-Based Scatter Compensation in Fully 3D SPECT Image Reconstruction", Phys. Med. Biol., vol. 43, No. 4, pp. 857-873, Apr. 1998.

Robert F. Hobbs et al., "Arterial Wall Dosimetry for Non-Hodgkin Lymphoma Patients Treated with Radioimmunotherapy", The Journal of Nuclear Medicine, vol. 51, No. 3, pp. 368-375, Mar. 2010.

Robert F. Hobbs et al., "$^{124}$I PET-Based 3D-RD Dosimetry for a Pediatric Thyroid Cancer Patient: Real-Time Treatment Planning and Methodologic Comparison", The Journal of Nuclear Medicine, vol. 50, No. 11, pp. 1844-1847, Nov. 2009.

Andrew R. Prideaux et al., "Three-Dimensional Radiobiologic Dosimetry: Application of Radiobiologic Modeling to Patient-Specific 3-Dimensional Imaging-Based Internal Dosimetry", The Journal of Nuclear Medicine, vol. 48, No. 6, pp. 1008-1016, Jun. 2007.

John F. Fowler, "The Linear-Quadratic Formula and Progress in Fractionated Radiotherapy", The British Journal of Radiology, vol. 62, No. 740, pp. 679-694, Aug. 1989.

William T. Millar, "Application of the Linear-Quadratic Model with Incomplete Repair to Radionuclide Directed Therapy", The British Journal of Radiology, vol. 64, No. 759, pp. 242-251, Mar. 1991.

D.J. Brenner et al., "The Linear-Quadratic Model and Most Other Common Radiobiological Models Result in Similar Predictions of Time-Dose Relationships", Radiation Research, vol. 150, pp. 83-91 (1998).

Robert F. Hobbs et al., "Calculation of the Biological Effective Dose for Piecewise Defined Dose-Rate Fits", Med. Phys., vol. 36, No. 3, pp. 904-907, Mar. 2009.

R. G. Dale, "The Application of the Linear-Quadratic Dose-Effect Equation to Fractionated and Protracted Radiotherapy", The British Journal of Radiology, vol. 58, No. 690, pp. 515-528, Jun. 1985.

R. K. Bodey et al., "Combining Dosimetry for Targeted Radionuclide and External Beam Therapies Using the Biologically Effective Dose", Cancer Biotherapy & Radiopharmaceuticals, vol. 18, No. 1, pp. 89-97 (2003).

Rachel K. Bodey et al,. "Application of the Linear-Quadratic Model to Combined Modality Radiotherapy", Int. J. Radiation Oncology Biol. Phys., vol. 59, No. 1, pp. 228-241 (2004).

D. J. Brenner et al., "Conditions for the Equivalence of Continuous to Pulsed Low Dose Rate Brachytherapy", Int. J. Radiation Oncology Biol. Phys., vol. 20, pp. 181-190, Jan. 1991.

C. Chiesa et al., "A Practical Dead Time Correction Method in Planar Activity Quantification for Dosimetry During Radionuclide Therapy", The Quarterly Journal of Nuclear Medicine and Molecular Imaging, vol. 53, No. 6, pp. 5658-5670, Dec. 2009.

G. Delpon et al., "Correction of Count Losses Due to Deadtime on a DST-Xli (SMVi-GE) Camera During Dosimetric Studies in Patients Injected with Iodine-131", Physics in Medicine and Biology, vol. 47, pp. N79-N90 (2002).

James A. Sorenson et al., "Methods of Correcting Anger Camera Deadtime Losses", Journal of Nuclear Medicine, vol. 17, No. 2, pp. 137-141 (1976).

Kenneth R. Zasadny et al., "Dead Time of an Anger Camera in Dual-Energy-Window-Acquisition Mode", Med. Phys., vol. 20, No. 4, pp. 1115-1120, Jul./Aug. 1993.

Indra J. Das et al., "Intensity-Modulated Radiation Therapy Dose Prescription, Recording, and Delivery: Patterns of Variability Among Institutions and Treatment Planning Systems", JNCI, vol. 100, Issue 5, pp. 300-307, Mar. 5, 2008.

\* cited by examiner

METHOD AND SYSTEM FOR GAMMA CAMERA COUNT RATE SATURATION CORRECTION

This invention was made with government support under grant number CA116477awarded by the National Institutes of Health. The government has certain rights in the invention.

DESCRIPTION OF EMBODIMENTS OF THE INVENTION

System for Count Rate Saturation Correction

Figure 1:
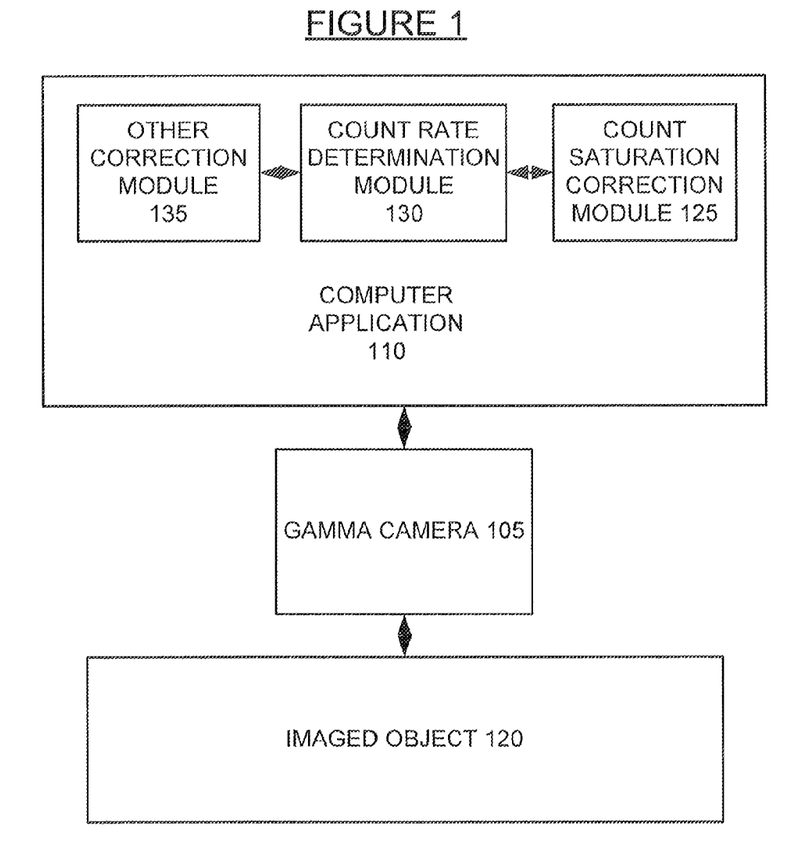
FIG. 1 illustrates a system for count rate saturation correction, according to one embodiment.

FIG. 1 illustrates a system 100 for count rate saturation correction, according to one embodiment. In system 100, at least one detector (e.g., gamma camera 105) images an imaged object 120 and uses a computer application 110 to process information from the images to determine the count rate. A gamma camera 105 is a device used to image gamma radiation emitting radioisotopes. It can be used to view and analyze images of the human body or the distribution of radionuclides emitting gamma rays (e.g., to treat cancer). A gamma camera 105 can comprise one or more flat crystal planes (or detectors) optically coupled to an array of photomultiplier tubes. This assembly is sometimes known as a "head", mounted on a gantry. The gamma camera 105 can be connected to a computer application 110 that can control the operation of the camera and/or the acquisition and storage of acquired images. The computer application 110 can accumulate events, or counts, of gamma photons that are absorbed by the crystal in the camera.

Accurate dosimetry from whole body (WB) images requires correcting for a wide range of physical processes, including camera count rate saturation (also called dead-time correction). The count rate is the number of events (e.g., images) taken per a unit time (e.g., per second or per minute). Dead-time is time when the gamma camera 105 is unable to take an image (e.g., the gamma camera 105 has to reset before can take another image and is thus unable to record an image until it resets). Thus, for example, if the gamma camera 105 is imaging an organ with a very high radioactivity concentration (e.g., a very "hot" liver), because of the dead-time, the gamma camera 105 will indicate that the radioactivity concentration or total radioactivity in the liver is lower than it really is.

Because the count rate varies as a function of the activity in the field of view, the correction factor during a WB scan can depend on the gamma camera head position relative to the anatomical distribution of radioactivity. For example, in patients with tumors that concentrate the radioactivity, large variations in activity distributions resulting in variable (i.e., bed-position-dependent) count rates may be expected. These can be accounted for in the saturation correction for a WB planar sweep image. This is especially important as dead time is activity dependent, and, for a patient with multiple imaging sessions over time, will not affect each time point image equally. Consequently, the accuracy of the WB imaging can be affected.

Computer application 110 can thus include a count rate module 130 that determines the count rate. The count rate module 130 can communicate with a count saturation correction module 125 that can correct the measured count rate for dead-time effects for relative motion between the gamma camera 105 and the imaged object 120. This count rate saturation correction module 125 can use an algorithm that is based on a static saturation curve assuming a paralyzable system (e.g., at a count rate that can be handled by the imaging system, prior detected events (photon hits on the crystal) do not influence subsequent events), described in more detail below. At least one other count rate correction module 135 can be used to adjust the count rate to correct for other issues.

Method for Count Rate Saturation Correction

Figure 2:
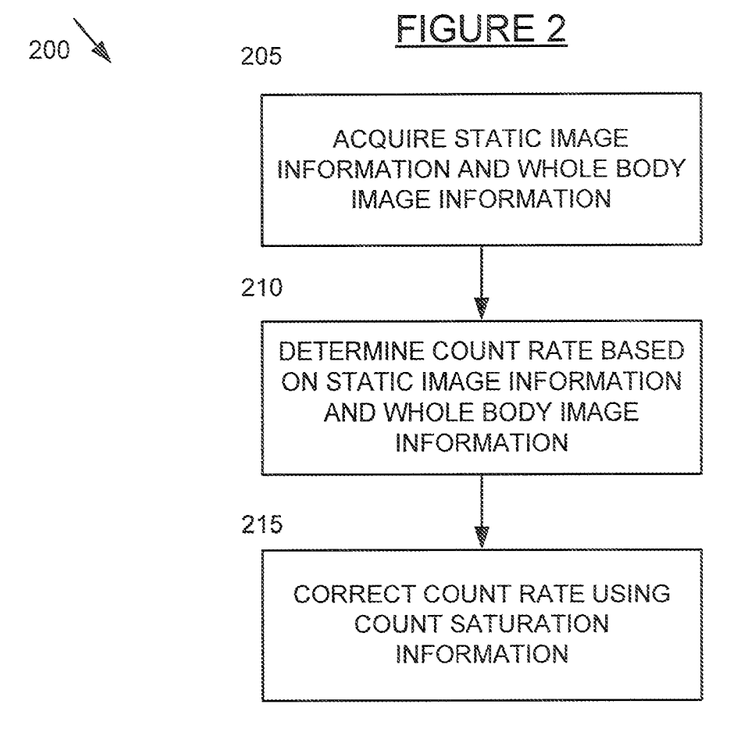
FIG. 2 illustrates a method for count rate saturation correction, according to one embodiment.

FIG. 2 illustrates a method 200 for count rate saturation correction, according to one embodiment. In 205, static image information and WB images information (also called sweep information) can be acquired, with a gamma camera 105. For example, a GE Infinia Hawkeye (GE Healthcare, Waukesha, Wis., USA) can be used to collect static images and WB images. In 210, the count rate is determined based on the static image information and the WB image information. In 215, the count rate is adjusted to incorporate count saturation corrections. Count saturation indicates that the gamma camera 105 is working at full capacity.

Figure 3:
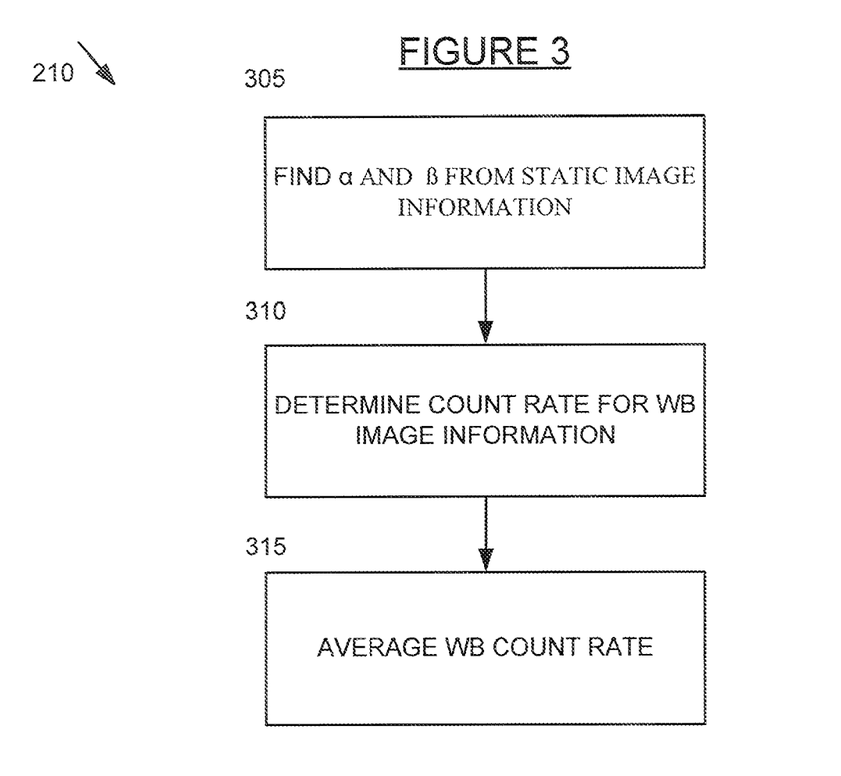
FIG. 3 sets forth additional details of how the count rate is determined, according to one embodiment.

FIG. 3 sets forth additional details of how the count rate is determined (210), according to one embodiment. In 305, a linear response coefficient value $\alpha$ and a dead-time coefficient $\beta$ are found from the static image information collected over a range of count rates that include low and high, the latter leading to camera saturation. Typically a phantom is used to collect this information so that the relationship between the true count rate in the phantom and the imaged count rate can be obtained and used to perform the saturation correction. In a paralyzable system, a linear response between the count rate C and the activity A, in the absence of dead time is obtained, the following formula can represent the linear relationship:

$$C(A) = \alpha A e^{-\beta A} \qquad \text{(Equation 1)}$$

Figure 7:
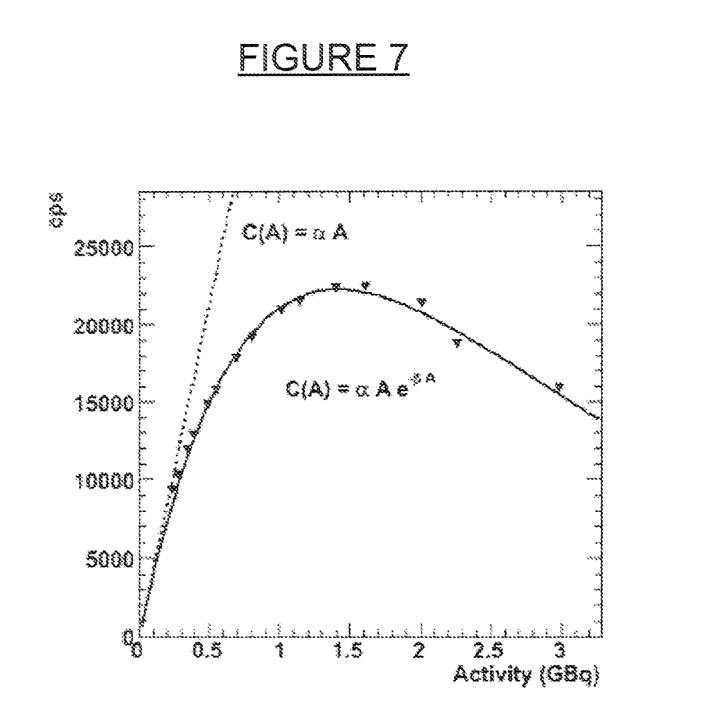
FIG. 7 illustrates an example phantom saturation curve, according to one embodiment.

Thus, for example, assume an elliptical phantom (a=15 cm, b=11 cm, h=24.5 cm) is filled with 12650 ml of water containing 2.89 GBq of $^{153}$Sm-EDTMP. Within the phantom, a small sphere (V=90 ml) is filled with water containing a higher concentration of $^{153}$Sm-EDTMP (161 MBq, signal to background ration≈4:1) to simulate a tumor with higher uptake. Static images can be acquired twice daily over a one week period and the measured counts plotted versus physical decay-corrected initial activity. By fitting Equation 1 to the data obtained from the phantom measurements described above, the parameters values $\alpha$ and $\beta$ can be obtained. Standard methods and computer programs for performing such fits are available (e.g., the Simulation Analysis and Modeling package, SAAM II from the SAAM Institute). An example of one such fit is shown in FIG. 7.

In 310, the count rate for the WB image information can be determined. The WB image count rate $c_{ij}$, at a given longitudinal position, i (designated as the y-axis) when the camera is in position (or time point) j, can be $$C_{ij}(A) = \alpha A_i e^{-\beta \sum_{k=j-w+1}^{j} A_k} \quad \text{(Equation 2)}$$

where A is the activity, $\alpha$ is the linear response coefficient, $\beta$ is the dead-time coefficient, k is the additional index, and W is the width of the detector in pixels (e.g., 256).

Thus, for example, assume the phantom is imaged using WB sweeps at 50 h, 122 h and 264 h after creation of the phantom. The last time point (264 h) can be used to provide data from a low count rate scenario for comparison and thus to provide a measure of the order of the systematic error in the calculation of the activity from the corrected and uncorrected count rates. In this case $c_{ij}(A)$ can be found using the values $\alpha$ and $\beta$ from 305, $A_i$=activity at row i, j=column number, W=width of detector in pixels=256, and $A_k$=the activity at position k within the sum shown in Equation 2; k is the index for the sum. Plugging all of these values in Equation 2 gives a WB image count rate, $c_{ij}$, as a function of the row i and column j.

Figure 4:
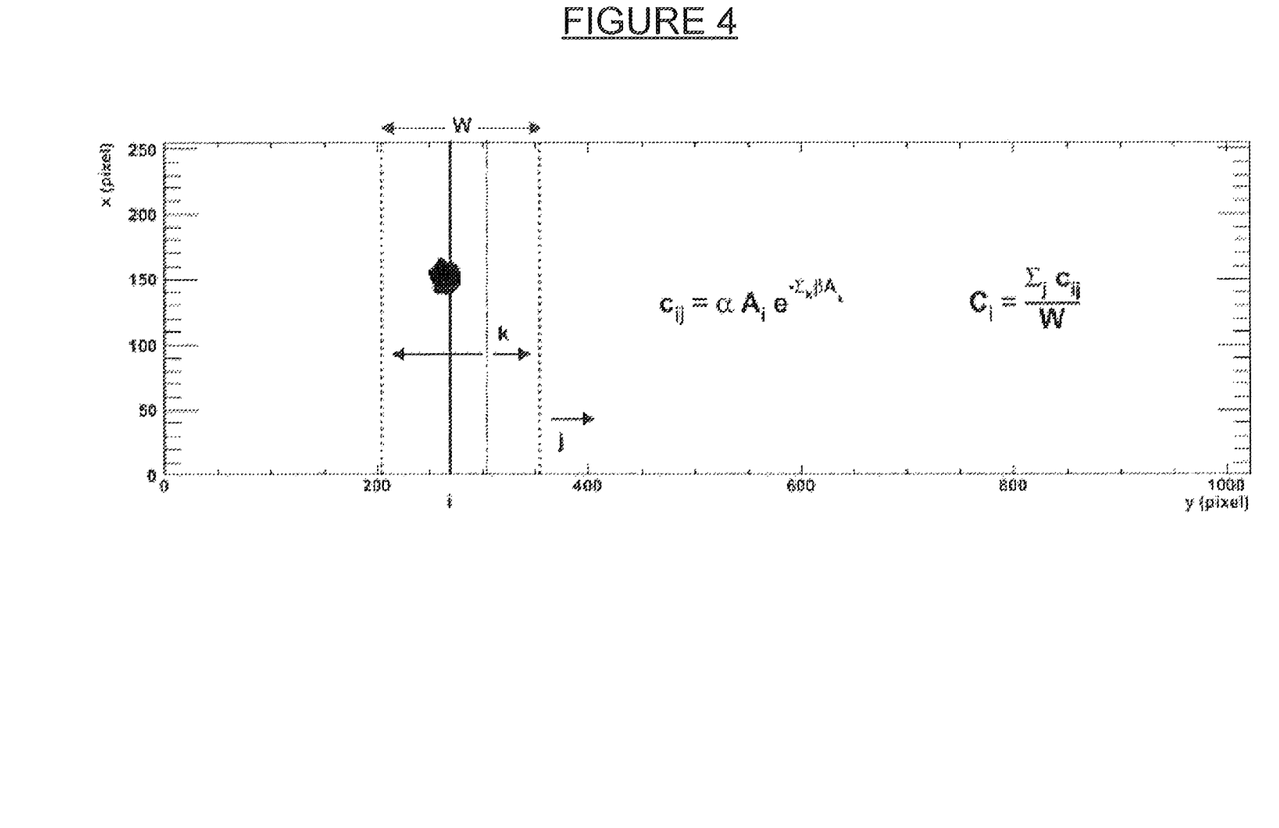
FIG. 4 illustrates indices as a function of position, according to one embodiment.

It should be noted that the index i can span the patient length and provide the y-pixel position for the count rate seen along a given column i of the WB image and can vary from 0 to N−1 (e.g., N can be 1024). For a given position i, the index j can indicate the position of the leading edge of the detector; j can range from i to i+W−1 (i.e., all detector positions that include the column i in the field of view). The additional index k can be used to sum over all columns of the detector for each value of j to provide the total activity seen by the detector at each detector position j; k varies from j−W+1 to j. The indices as a function of position are illustrated in FIG. 4, which is explained in more detail below.

In 315, the WB image count rate $c_{ij}$ is averaged over the width of the detector to account for the total time that the detector overlaps with the column at index i. In other words, the count rate at position i ($C_i$) is the sum of count rates measured when the camera is in different positions which include the y-position i, within the detector head field of view, divided by the number of such camera positions. Thus, the WB image count rate average $C_i(A)$ is $$C_i(A) = \frac{\alpha \sum_{i=i}^{j+w-1} A_i e^{-\beta \sum_{k=j-w+1}^{j} A_k}}{\sum_{j=i}^{j+w-1} j}. \quad \text{(Equation 3)}$$

In some embodiments, the values for the variables j and k can only be entered into the equation for $C_i$ if the following constraints are satisfied:

$$\begin{cases} j, k \geq 0 \\ j < N + W \\ k < N. \end{cases}$$

It should be noted that both conditions on j can always be satisfied and the denominator in Equation 3 can reduce to W. However, the conditions are not always satisfied for k and must be checked. These conditions can apply to all equations throughout this specification that include summation over indices representing columns.

Thus, the following values can be input into Equation 3 to obtain WB image count rate average $C_i(A)$: the values $\alpha$ and $\beta$ from 305, $A_i$=activity at i, j=column number, W=width of detector in pixels, and $A_k$=the activity at position k. Plugging all of these values in Equation 2 gives a WB image count rate $c_{ij}$.

Thus, referring back to FIG. 4, in this figure, the different indices i, j and k from Equations 2 and 3 are illustrated against a backdrop of an imaged tumor radius of interest (ROI). Here i is the column number of the imaged object denoted by the solid line. For each i, the index j denotes the y-position of the leading edge of the detector, valid for all different positions where it images the ith column. The detector is indicated by the two dotted lines. For each of those j detector positions, the sum of activities in all the k columns from j−W+1 to j, seen by the camera, is the activity that contributes to the dead-time effect.

Figure 5:
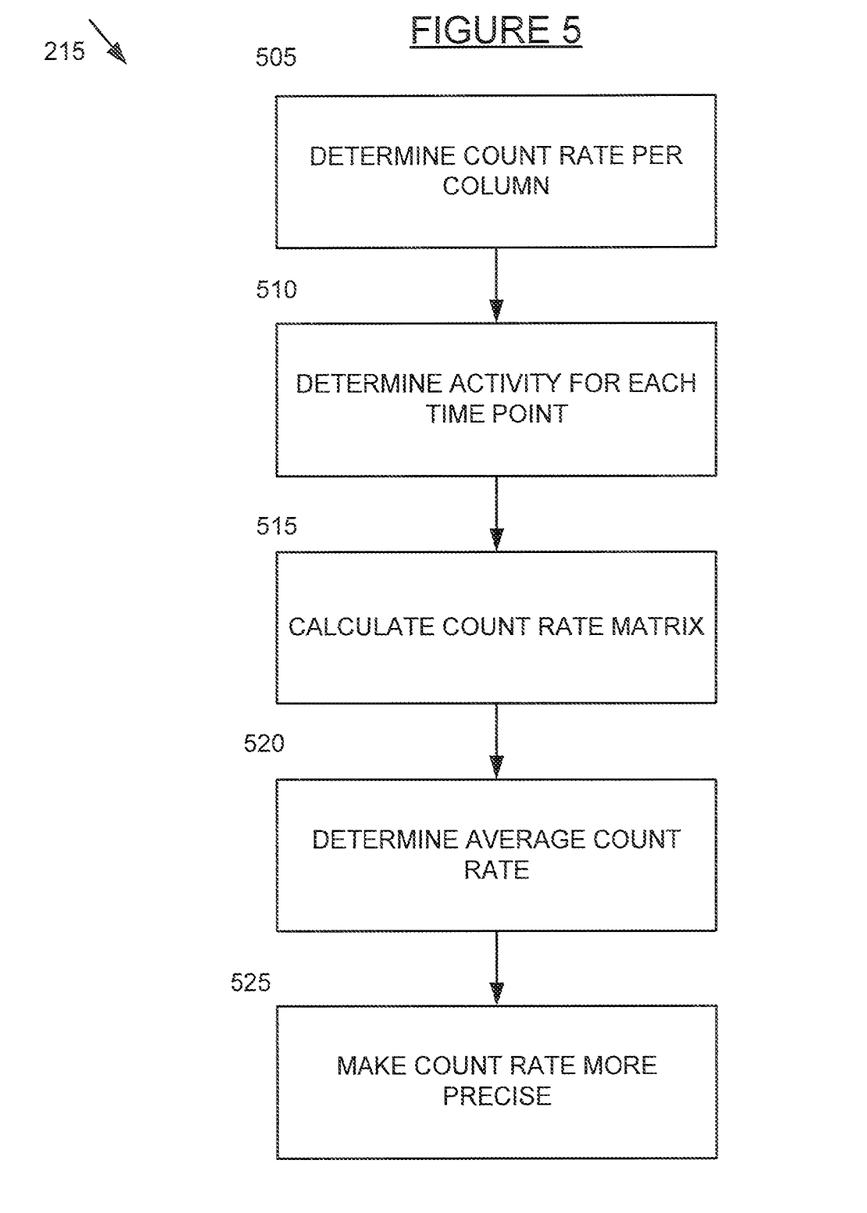
FIG. 5 sets forth details relating to how the count rate is adjusted, according to one embodiment.

FIG. 5 sets forth details relating to how the count rate is adjusted (215), according to one embodiment. In 505, for each pixel column position i, an approximation of the activity $A_i$, from the summed measured (m) count rate per column $C_{i(m)}$ can be determined using, in one embodiment, the following formula:

$$A_{i(1)} = \frac{C_{i(m)}}{\alpha} \quad \text{(Equation 4)}$$

Thus, for example, if $\alpha$ is 0.001 then the count rate detected, C, is 1000 times less than the true count rate, A.

In 510, the activity seen by the detector for each time point j can be found by summing up the activities $A_k$. (Note that j can vary from 0 to N+W−1.) In one embodiment, the following formula can be used:

$$A_j = \sum_{k=j-W+1}^{j} A_k. \quad \text{(Equation 5)}$$

In 515, each count rate matrix element $c_{ij}$ can be calculated using the above values for $A_i$ and $A_j$. In one embodiment, the following formula can be used:

$$c_{ij} = \alpha A_i e^{-\beta A_j} \quad \text{(Equation 6)}$$

In 520, the average count rate $C_i$ can be determined using the above value for $c_{ij}$, using the following formula:

$$C_i = \frac{\sum_{j=i}^{i+W-1} c_{ij}}{W} \quad \text{(Equation 7)}$$

In 525, the next (n+1)st approximation of $A_i$ (where $C_{i(m)}$ is the initial measured count rate) can be calculated, using the following formula:

$$A_{i(n+1)} = A_{i(n)}\left(1 + \frac{C_{i(m)} - C_{i(n)}}{C_{i(n)}(1 - \beta A_{i(n)})}\right) \quad \text{(Equation 8)}$$

This can be done in order to reach a more precise value for each $A_i$.

In 530, 510-525 can be repeated, and the difference between successive values of $A_i$ can be calculated until the desired precision is reached for each $A_i$.

Figure 6:
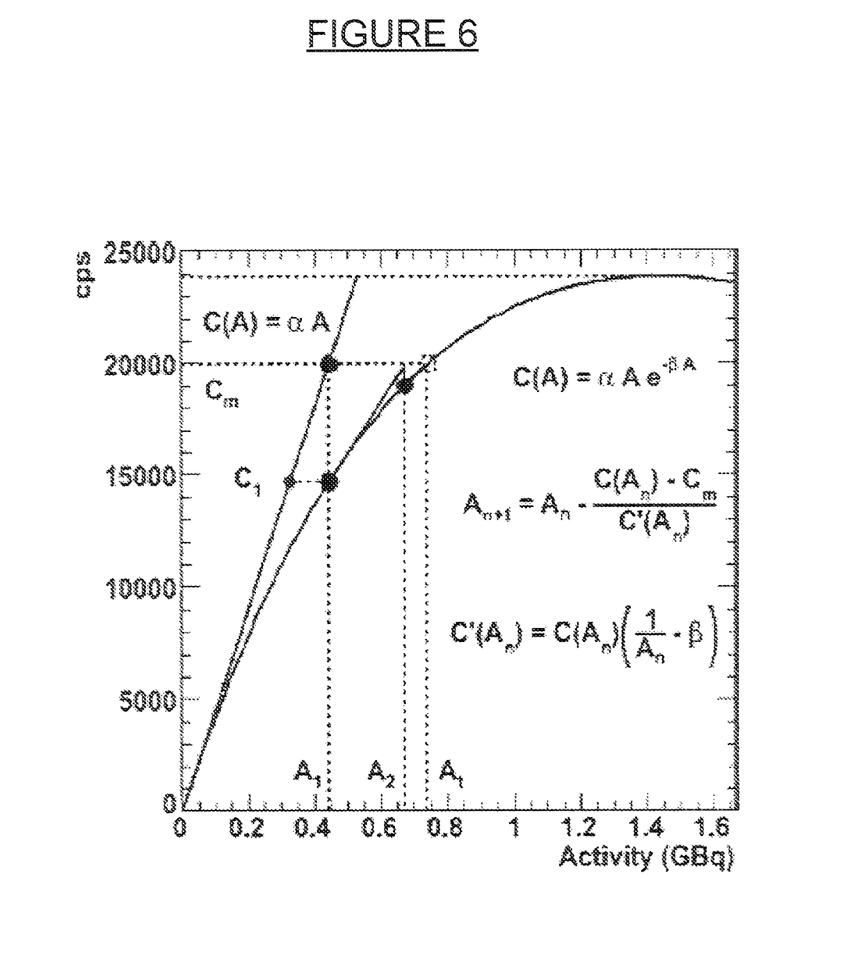
FIG. 6 illustrates an example of a correction algorithm in one dimension, according to one embodiment.

FIG. 6 illustrates an example of the correction algorithm in one dimension (i.e., i=1). In this example, A, is the true activity and $C_m$ is the measured count rate.

FIG. 7 illustrates an example phantom saturation curve. In this example, the phantom comprises plexiglass covering 1.2 cm. of solution, so the appropriate attenuation modifiers were applied. The triangles in FIG. 7 are the measured counts per second (cps) values as a function of the activity in the phantom. The solid line shows the fit using Equation 1 and the dotted line shows the theoretically unsaturated linear response. The determined $\alpha$ and $\beta$ values can be the same as those used in FIG. 4.

Figure 8:
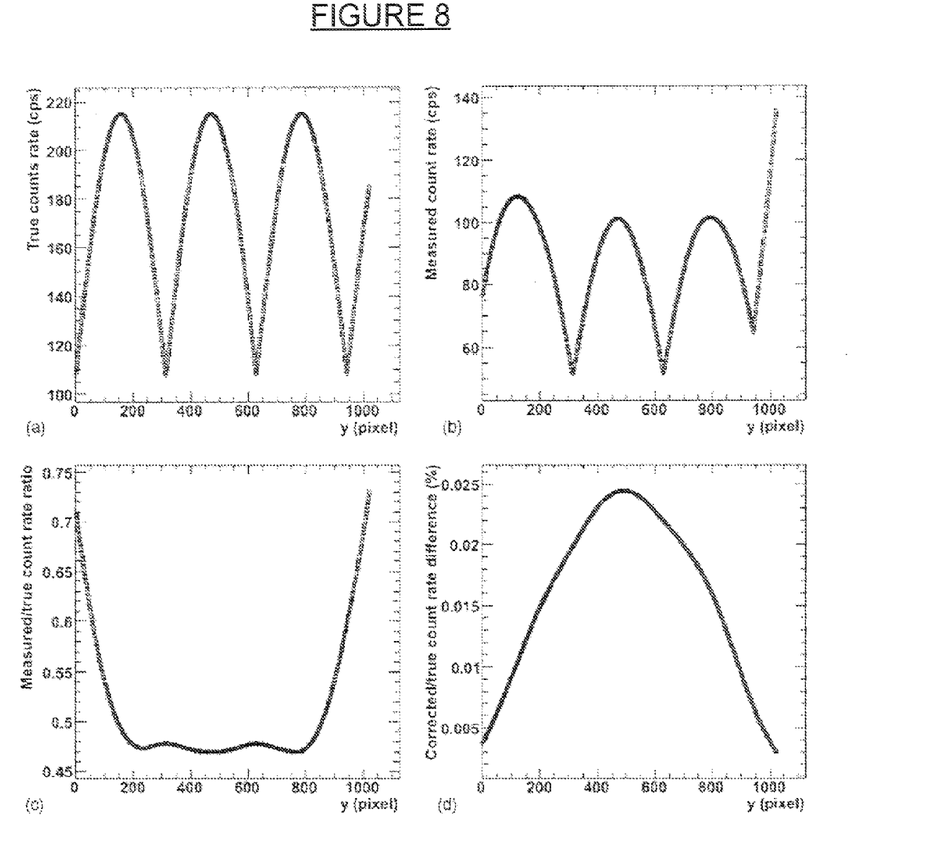
FIG. 8 illustrates example iterative saturation results for simulated data, according to one embodiment.

FIG. 8 illustrate example iterative saturation results for simulated (computer-generated) data. 8a illustrates the original "true" count rate (cps) data; 8b illustrates the simulated (computer-generated) count rate; 8c illustrates the ratio of measured count rate to the original "true" count rate with no saturation correction; and 8d illustrates the ratio of corrected count rate to the original "true" count rate.

Figure 9:
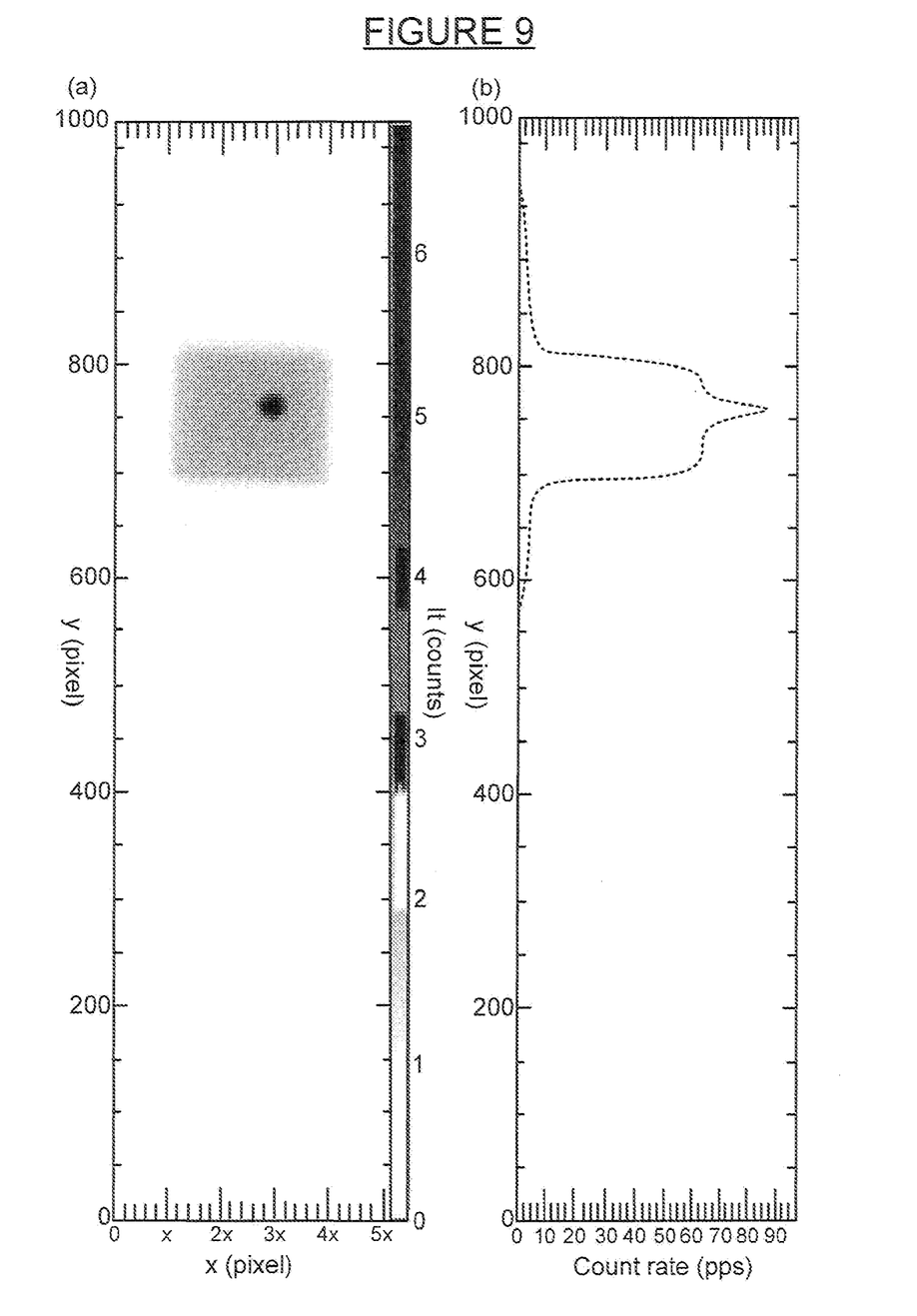
FIG. 9 illustrates an example of count rate data taken from a phantom, according to one embodiment.

FIG. 9 illustrates an example of count rate data taken from a phantom. In 9a, the counts measured in the phantom using a WB sweep with a log scale are illustrated. The y-axes are the same for both images. In 9b, the x-axis illustrates the average count rate per pixel across the y-column.

Figure 10:
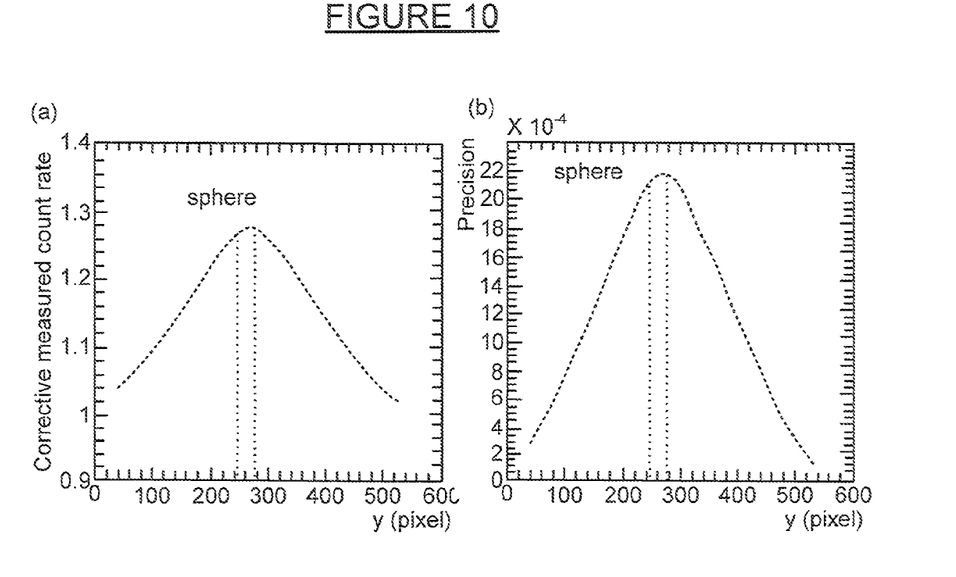
FIG. 10 illustrates an example of first time point phantom corrected count rate results, according to one embodiment.

FIG. 10 illustrates an example of first time point phantom corrected count rate results. In 10a, the ratio of the corrected values to the measured count rates as a function of the y-position (the y-axis in FIG. 9) is illustrated. In 10b, the difference between the re-simulated count rate and the measured count rate as a function of the y-position is illustrated, reflecting the precision of the correction (e.g., for a maximum difference of 0.00022%).

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark. Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for adjusting count rate information, comprising:
   acquiring, using at least one detector, static image information from at least one imaged object;
   acquiring, using the at least one detector, whole body image information from the at least one imaged object such that the whole body image information is distinct from the static image information, wherein the whole body images information is sweep information;
   determining, using at least one computer application, the count rate information using the static image information and the whole body image information; and
   adjusting, using the at least one computer application, the count rate information using count saturation information and by accounting for movement of the at least one detector with respect to the at least one imaged object.

2. The method of claim 1, wherein the at least one detector is at least one gamma camera.

3. The method of claim 1, wherein the at least one imaged object is: at least one phantom and/or at least one patient.

4. The method of claim 1, wherein the static image information and/or the whole body information is two dimensional.

5. The method of claim 1, wherein the static image information and/or the whole body image information is three dimensional.

6. The method of claim 1, wherein the movement between the at least one detector and the at least one imaged object is caused by the at least one detector moving over the at least one imaged object.

7. The method of claim 1, wherein the movement between the at least one detector and the at least one imaged object is caused by the at least one detector obtaining image information from multiple angles of the at least one imaged object.

8. The method of claim 1, wherein the movement between the at least one detector and the at least one imaged object is caused by the at least one detector obtaining image information from the at least one imaged object at different times.

9. The method of claim 1, further comprising:
   using the adjusted count rate information to determine dosage to administer.

10. A system for adjusting count rate information, comprising:
    at least one application executed by at least one processor, the at least one application configured for:
    acquiring, using at least one detector, static image information from at least one imaged object;
    acquiring, using the at least one detector, whole body image information from the at least one imaged object such that the whole body image information is distinct from the static image information, wherein the whole body image information is sweep information;
    determining the count rate information using the static image information and the whole body image information; and
    adjusting the count rate information using count saturation information and by accounting for movement of the at least one detector with respect to the at least one imaged object.

11. The system of claim 10, wherein the at least one detector is at least one gamma camera.

12. The system of claim 10, wherein the at least one imaged object is: at least one phantom and/or at least one patient.

13. The system or claim 10, wherein the static image information and/or the whole body information is two dimensional.

14. The system of claim 10, wherein the static image information and/or the whole body image information is three dimensional.

15. The system of claim 10, wherein the movement between the at least one detector and the at least one imaged object is caused by the at least one detector moving over the at least one imaged object.

16. The system of claim 10, wherein the movement between the at least one detector and the at least one imaged object is caused by the at least one detector obtaining image information from multiple angles of the at least one imaged object.

17. The system of claim 10, wherein the movement between the at least one detector and the at least one imaged object is caused by the at least one detector obtaining image information from the at least one imaged object at different times.

18. The system of claim 10, wherein the at least one application is further configured for:
   using the adjusted count rate information to determine dosage to administer.

* * * * *